US008636964B2

(12) United States Patent
Brunello et al.

(10) Patent No.: US 8,636,964 B2
(45) Date of Patent: Jan. 28, 2014

(54) FLUID CONNECTORS FOR MICROREACTOR MODULES

(75) Inventors: Pierre Brunello, Villecerf (FR); Paul Louis Florent Delautre, Lisses (FR); Sylvain Maxime F Gremetz, Montereau Fault Yonne (FR); Olivier Lobet, Mennecy (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/641,323

(22) PCT Filed: Apr. 12, 2011

(86) PCT No.: PCT/US2011/032001

§ 371 (c)(1),
(2), (4) Date: Oct. 15, 2012

(87) PCT Pub. No.: WO2011/136915

PCT Pub. Date: Nov. 3, 2011

(65) Prior Publication Data

US 2013/0034475 A1    Feb. 7, 2013

(30) Foreign Application Priority Data

Apr. 19, 2010    (EP) .................................... 10305405

(51) Int. Cl.
*B01L 99/00*    (2010.01)

(52) U.S. Cl.
USPC ........... 422/544; 422/129; 422/203; 422/536; 422/537; 422/538; 422/180

(58) Field of Classification Search
USPC .......................... 422/129, 203, 536–538, 544
See application file for complete search history.

(56) References Cited

U.S. PATENT DOCUMENTS

| 3,476,414 A | 11/1969 | Condrac .................. 285/349 |
| 4,032,118 A | 6/1977 | Phillips ................... 259/122 |
| 5,152,556 A | 10/1992 | Holland .................. 285/353 |
| 6,595,232 B2 | 7/2003 | Guzman ................. 137/15.01 |
| 2010/0068107 A1 | 3/2010 | Tanguy ..................... 422/236 |

FOREIGN PATENT DOCUMENTS

| DE | 9017376.7 | 12/1990 | ............ F16L 19/03 |
| EP | 0890771 | 7/1998 | ............ F16L 15/04 |
| WO | 2007/131925 | 11/2007 | ............ B01L 9/00 |
| WO | 2008/106161 | 9/2008 | ............ C03B 11/08 |

*Primary Examiner* — Jyoti Nagpaul
(74) *Attorney, Agent, or Firm* — Gregory V. Bean

(57) ABSTRACT

An end-face sealing fluidic connector for fluidic connection and/or interconnection of glass, glass-ceramic and/or ceramic fluidic modules in a microreactor includes a connector body having a circular first end face with a recess for retaining one or more O-rings and a first end section having a circular cylindrical outeT surface and a diameter In the range of from 3 to 25 mm. The outer surface has a circumferential recess dividing the first end section into a proximal portion adjacent the first end face and a distal portion. A retaining ring is seated in the circumferential recess and a protecting ring coinpming a high-compression-strength polymer surrounds the proximal portion of the first end section. A circular cylindrical sleeve surrounds the first end section and the reinforcing and/or protecting ring, the sleeve including a circumferentially extending inside bearing surface for engaging the retaining ring on the distal side thereof.

15 Claims, 4 Drawing Sheets

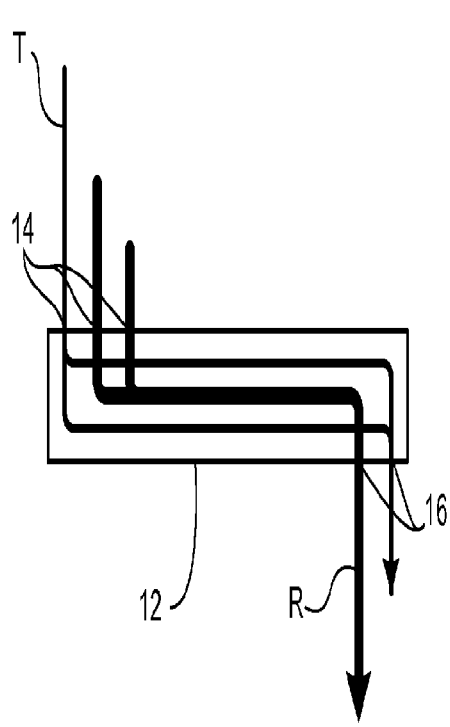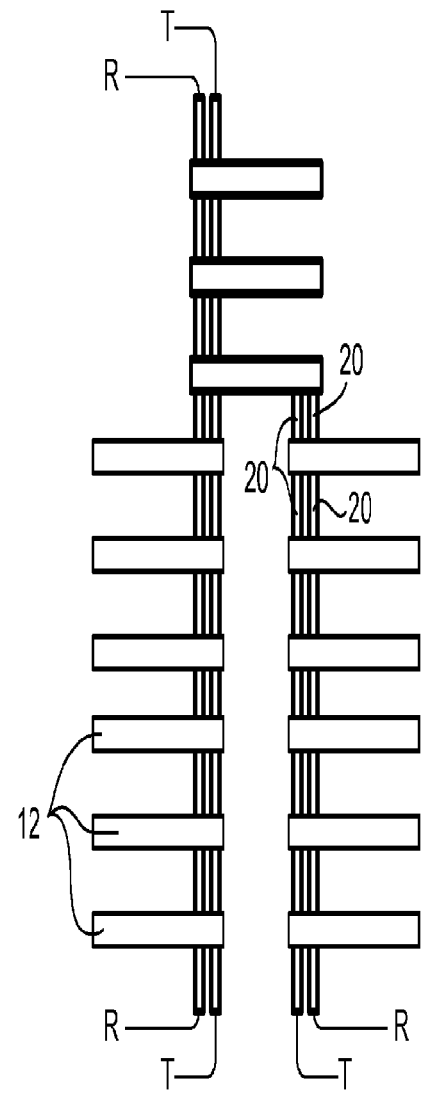
FIG. 1
FIG. 2

FLUID CONNECTORS FOR MICROREACTOR MODULES

This application claims the benefit of priority of European Application No. 10305405.2 filed on Apr. 19, 2010.

BACKGROUND

The present invention relates in general to fluid connectors for microfluidic modules, and in particular to end-face sealing fluid connectors for microfluidic modules providing good pressure resistance, good chemical resistance, and capable of sealing against glass, glass-ceramic and/or ceramic microfluidic module materials with low risk of damage to the respective module.

SUMMARY

One embodiment provides an end-face sealing fluidic connector [20] for fluidic connection and/or interconnection of glass, glass-ceramic and/or ceramic fluidic modules [12] in a microreactor [10] and includes a connector body [22] having a circular first end face [26] with a recess [28] for retaining one or more O-rings [30]. The connector body [22] has a first end section [32] having a circular cylindrical outer surface [34] having a diameter [36] in the range of from 3 to 25 mm extending along the connector body [22] from the first end face [26]. The outer surface [34] of the first end section [32] is having a circumferential recess [38] dividing the first end section [32] into a proximal portion [40] adjacent the first end face [26] and a distal portion [42] separated from the proximal portion [40] by the circumferential recess [38]. A retaining ring [48] is seated in the circumferential recess and a circular cylindrical circumferential reinforcing and/or protecting ring [50] surrounds the proximal portion [40] of the first end section [32], the ring [50] being comprised of a high-compression-strength polymer. A circular cylindrical sleeve [58] surrounds the first end section [32] and the reinforcing and/or protecting ring [50], the sleeve [58] including a circumferentially extending inside bearing surface for engaging the retaining ring [48] on the distal side thereof. The circular cylindrical sleeve [58] further comprises an external thread [66] on a proximal outer surface [68] thereof and a gripping surface [70] on a distal outer surface [72] thereof.

The resulting connector provides an economical but highly pressure resistant and highly chemical resistant means of interconnecting microfluidic modules in a microreaction environment. Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a schematic diagram of a fluidic module 12;

FIG. 2 is schematic diagram of multiple fluidic modules 12 connector via connectors 20 to form a microreactor 10;

DETAILED DESCRIPTION

Figure 3:
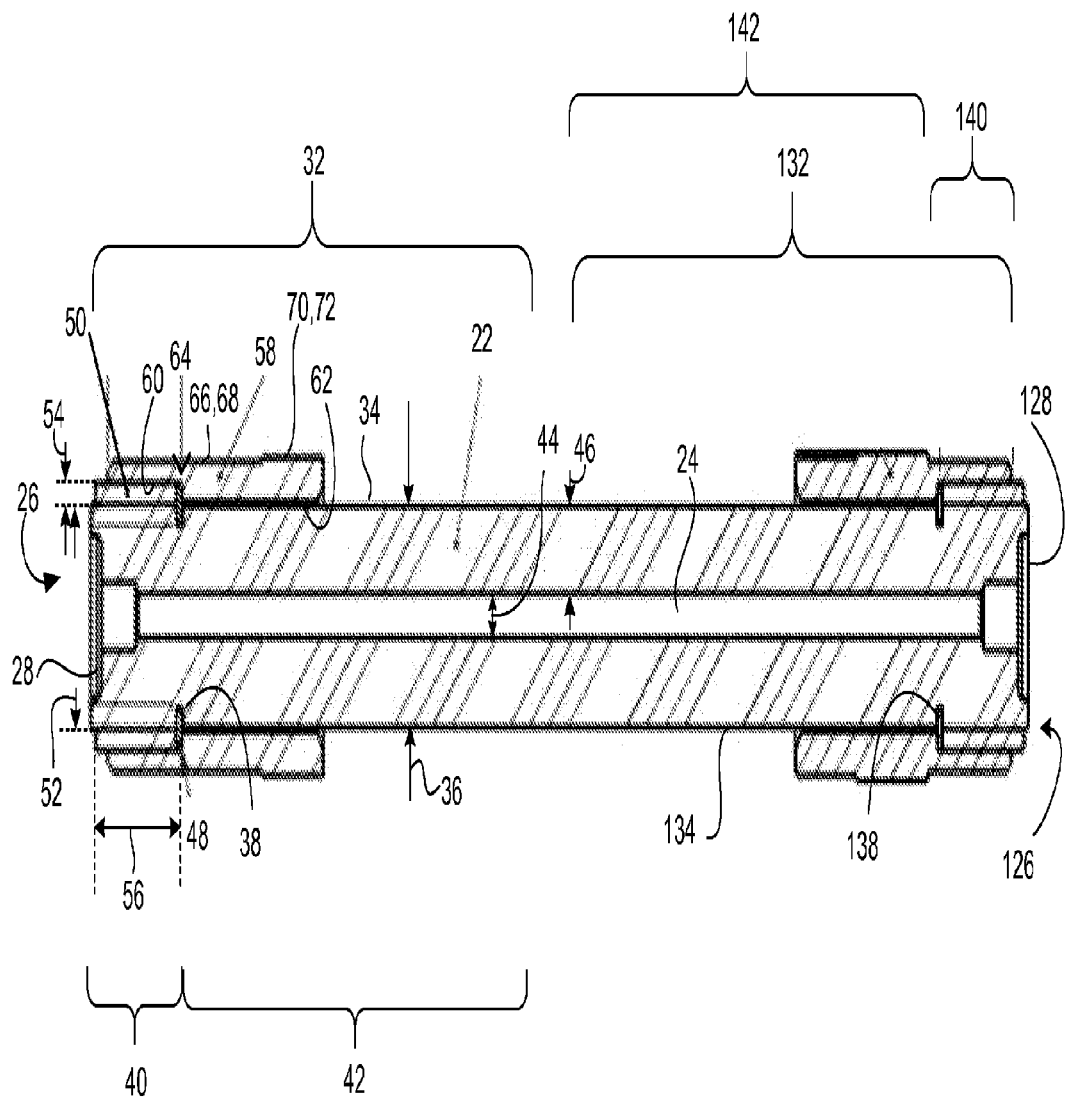
FIG. 3 is a cross-sectional view of one embodiment of a connector 20.

Reference will now be made in detail to the accompanying drawings which illustrate certain instances of the methods and devices described generally herein. Whenever possible, the same reference numerals will be used throughout the drawings to refer to the same or like parts.

FIG. 1 is a schematic diagram of a fluidic module 12 of a type developed by the present inventors and/or their colleagues. The module 12 is of a generally planar shape and typically includes therein a reactant or process fluid path R through which process fluids may be flowed, and a thermal fluid path T through which thermal control fluids may be flowed in co-flow (as shown), counter-flow, or in cross-flow arrangements relative to the predominate flow direction in the fluid path R. There may one or multiple input ports 14 or output ports 16 in either path, R and/or T. The input and output ports 14 and 16 are typically positioned, as shown in the diagram of FIG. 1, in one or more of the major planar faces of the module 12. In some modules, such as in the module 12 depicted diagrammatically in FIG. 1, the thermal fluid path may divide into two sub-paths, each lying along one of the large exterior surfaces of the module 12, and the reactant or process fluid path R may lie in between. More detail regarding modules 12 and processes useful in forming such modules may be found, for instance, in patent-related publications such as U.S. Pat. No. 6,595,232, US20100068107, and WO2008106161, all assigned to the assignee of the present invention.

FIG. 2 is a schematic diagram of one from among infinitely many possible arrangements of modules 12 interconnected to form a reactor 10. The modules are fluidically interconnected via connectors 20. More detail regarding some types of fluidic and mechanical interconnection means by which modules 12 may be made to form a reactor 10 may be found, for instance, in publications such as WO2007131925, assigned to the assignee of the present invention.

Figure 4:
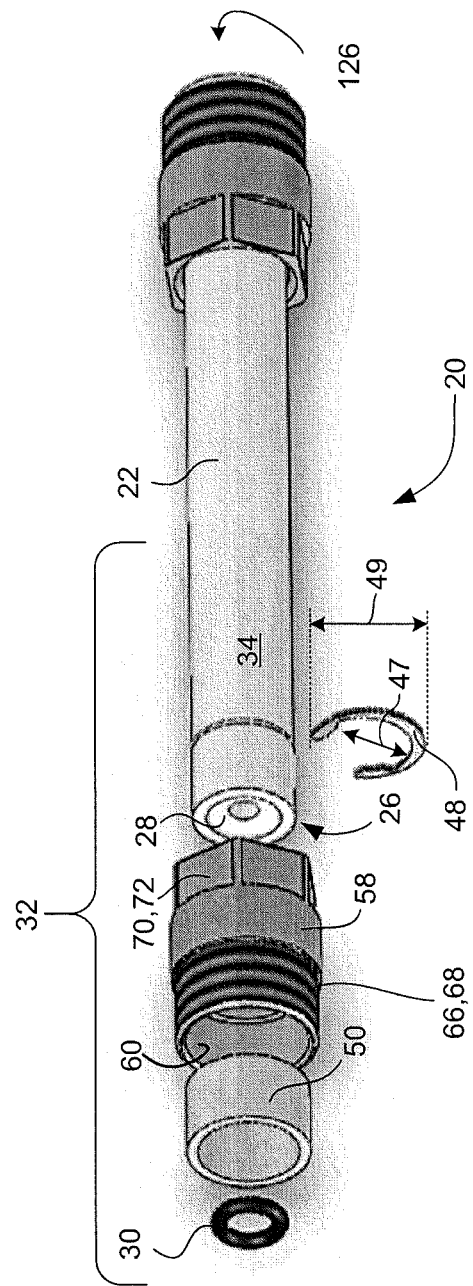
FIG. 4 is a perspective view of the connector 20 of FIG. 3 with components of the left end shown in an exploded perspective view.

FIG. 3 is a cross-sectional view of one embodiment of a connector 20, and FIG. 4 is a perspective view of the connector 20 of FIG. 3. According to one embodiment of the present disclosure, and as generally shown in FIGS. 3 and 4, an end-face sealing fluidic connector 20 is provided for fluidic connection and/or interconnection, especially of glass, glass-ceramic and/or ceramic fluidic modules 12 within a microreactor 10. The connector 20 includes a connector body 22 having a fluid passage 24 extending therethrough from a circular first end face 26. The first end face 26 has a recess 28 for retaining one or more O-rings 30. The connector body 22 has a first end section 32 having a circular cylindrical outer surface 34 having a diameter 36 in the range of from 3 to 25 mm extending along the connector body 22 from the first end face 26. The outer surface 34 of the first end section 32 is having a circumferential recess 38 dividing the first end section 32 into a proximal portion 40 adjacent the first end face 26 and a distal portion 42 separated from the proximal portion 40 by the circumferential recess 38. The fluid passage 24 within the first end section 32 preferably is centered within the diameter 36 and has a diameter 44 in the range of from 1 to 5 mm. The body 22 desirably has a wall thickness 46 at the first end section 32 within the range of from 0.8 to 10 mm. A retaining ring 48 having an inner diameter 47 and an outer diameter 49 is seated in the circumferential recess 38.

A circular cylindrical circumferential reinforcing and/or protecting ring 50 surrounds the proximal portion 40 of the first end section 32. The ring 50 has an inner diameter 52 equal to or greater than the diameter 36 such that it may be easily fitted over the cylindrical outer surface 34 of the proximal portion 40 of the first end section 32. The ring 50 further has a wall thickness 54 in the range of from 1 to 8 mm and an axial length 56 in the range of from 2 to 15 mm. The ring 50 is comprised of a high-compression-strength polymer, desirably of PEEK or a similarly high-performance material.

A circular cylindrical sleeve 58 surrounds the first end section 32 and the reinforcing and/or protecting ring 50. The sleeve 58 includes: (a) a proximal inside surface 60 having an inner diameter equal to or greater than the outer diameter of the ring 50 and (b) a distal inside surface 62 having an inner diameter equal to or greater than the diameter 36 of the outer surface 34 of the first end section 32 and less than the outer diameter 49 of the retaining ring 48, and (c) a circumferentially extending inside bearing surface 64 extending between the proximal and distal inside surfaces 60, 62 that engages the retaining ring 48 on the distal side thereof. The circular cylindrical sleeve 58 further comprises an external thread 66 on a proximal outer surface 68 thereof and a gripping surface 70 on a distal outer surface 72 thereof.

Desirably, the diameter 36 of the first end section 32 of the connector body 22 is constant, except for the circumferential recess 38, from the distal end of the first end section 32 to at or near the proximal end of the first end section 32.

According to one alternative embodiment, the connector 20 is double ended, that is, the connector 20 may further comprising a circular second end face 126, with the second end face 126 also having a recess 128 for retaining one or more O-rings (not shown). The connector body 22 then has a second end section 132 likewise having a circular cylindrical outer surface 134 having a diameter 36 in the range of from 3 to 25 mm extending along the connector body 22 from the second and face 126. The outer surface 134 of the second end section 132 is having a circumferential recess 138 dividing the second end section 132 into a distal portion 140 adjacent the second end face 126 and a proximal portion 142 separated from the distal portion 140 by the circumferential recess 138. The fluid passage 24 within the second end section 132 likewise desirably is centered within the diameter 36 and has a diameter 44 in the range of from 1 to 5 mm. The body 22 desirably has the same wall thickness 46 at the second end section 132, within the range of from 0.8 to 10 mm.

It may often be desirable to minimize the distance between adjacent fluidically connected modules 12 within a reactor 10, so that overall reactor size is minimized. Where distance between adjacent modules 12 is to be thus minimized, it is desirable that the cylindrical outer surface 34 and the cylindrical outer surface 134 are joined together and are continuous one with another, forming a single long cylindrical outer surface of the body 22.

Figure 5:
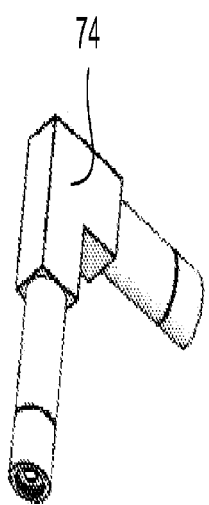
FIG. 5 and FIG. 6 are perspective views of a second and third embodiment of a connector 20.

In the case that a longer connector, or a connector that changes direction, is needed, the connector 20 may have the cylindrical outer surface 34 and the cylindrical outer surface 134 joined together by a mid-section 74 of the body 22 having a polygonal shape, as shown in FIG. 5, for example. The fluid passage 24 then extends through the mid-section 74, with a minimum wall thickness (not shown) within the mid-section 74 of at least as great as the wall thickness 46 so as to avoid weak locations that may negatively affect pressure resistance.

Figure 6:
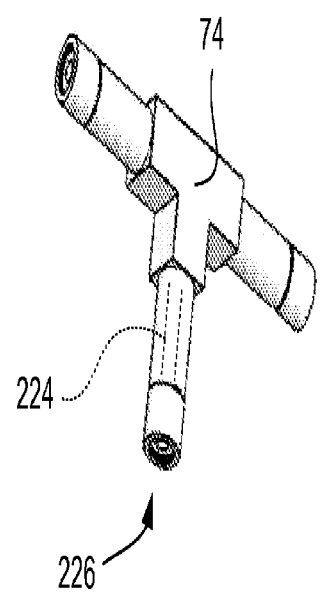

As shown in the perspective view of FIG. 6, according to another embodiment, the connector 20 further comprises a third end face 226, the third end face 226 having an opening into a branch passage 224 fluidically connected the fluid passage 24.

The body 22 of the connector 20 desirably comprises or is desirably formed of PFA, or alternatively desirably comprises or is desirably formed of PTFE. As another alternative embodiment, the body 22 may comprise or be formed of alumina.

The sleeve 58 may comprise or be formed of stainless steel.

The reinforcing and/or protecting ring 50 desirably abuts the retaining ring 48 on the proximal side thereof, and extends to within no closer than 0.4 mm of the first end face 26. The use of a high-performance polymer like PEEK provides significant reinforcement for bodies 22 of PTFE or PFA, particularly if those materials are employed at elevated temperatures and pressures near to their specified limits. Maintaining the distance to the end face 26 of at least 0.4 mm helps guarantee that the associated o-ring can always be under appropriate compression, for certain o-ring sizes and associated recesses, even if a body 22 of PFA or PTFE is softened somewhat during use.

Alternatively, the reinforcing and/or protecting ring 50 may extend beyond the first end face 26 by at least 0.4 mm if it is desired that the ring 50 be used to define or determine the o-ring compression.

In contrast with the ring 50 which is formed of high strength polymer, the sleeve 58, with bearing surface 64 in contact with the distal surface of the retaining ring 48, desirably extends along the body 22 to within no closer than 1.8 mm of the first end face 26. This helps ensure that the metal which is the preferred material of the sleeve does not contract the glass, glass-ceramic or ceramic, the preferred materials of the module 12, and thus cause damage to the material of the module 12, which is desirably glass, glass-ceramic, or ceramic.

The gripping surface 70 may comprise one or both of a roughened surface and a surface shaped to receive a wrench or other turning tool, as shown in FIG. 4.

The resulting connector provides an economical but highly pressure resistant and highly chemical resistant means of interconnecting microfluidic modules in a microreaction environment.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerization; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

It will be apparent to those skilled in the art that various modifications and variations can be made without departing from the spirit or scope of the invention.

What is claimed is:

1. An end-face sealing fluidic connector for fluidic connection and/or interconnection of glass, glass-ceramic and/or ceramic fluidic modules in a microreactor, the connector comprising:
    a connector body having a fluid passage extending therethrough from a circular first end face, the first end face having a recess for retaining one or more O-rings, the connector body having a first end section having a circular cylindrical outer surface having a diameter in the range of from 3 to 25 mm extending along the connector body from the first end face, the outer surface of the first end section having a circumferential recess dividing the first end section into a proximal portion adjacent the first end face and a distal portion separated from the proximal portion by the circumferential recess, the fluid passage within the first end section centered within the diameter and having a diameter in the range of from 1 to 5 mm, the body having a wall thickness at the first end section within the range of from 0.8 to 10 mm;
    a retaining ring seated in the circumferential recess and having an inner diameter and an outer diameter;
    a circular cylindrical circumferential reinforcing and/or protecting ring surrounding the proximal portion of the first end section, the ring having an inner diameter equal to or greater than the diameter such that it may be easily fitted over the cylindrical outer surface of the proximal portion of the first end section and a wall thickness in the range of from 1 to 8 mm and an axial length in the range of from 2 to 15 mm, the ring comprised of a high-compression-strength polymer; and
    a circular cylindrical sleeve surrounding the first end section and the reinforcing and/or protecting ring, the sleeve including (a) a proximal inside surface having an inner diameter equal to or greater than the outer diameter of the ring and (b) a distal inside surface having an inner diameter equal to or greater than the diameter of the outer surface of the first end section and less than an outer diameter of the retaining ring and (c) a circumferentially extending inside bearing surface extending between the proximal and distal inside surfaces for engaging the retaining ring on the distal side thereof, the circular cylindrical sleeve further comprising an external thread on a proximal outer surface thereof and a gripping surface on a distal outer surface thereof.

2. The connector according to claim 1 wherein the diameter of the first end section of the connector body is constant, except for the circumferential recess 38, from the distal end of the first end section to at or near the proximal end of the first end section.

3. The connector according to claim 1 further comprising a circular second end face, the second end face having a recess for retaining one or more O-rings, the connector body having a second end section having a circular cylindrical outer surface having a diameter in the range of from 3 to 25 mm extending along the connector body from the second and face, the outer surface of the second end section broken only by a circumferential recess dividing the second end section into a distal portion adjacent the second end face and a proximal portion separated from the proximal portion by the circumferential recess, the fluid passage within the second end section centered within the diameter and having a diameter in the range of from 1 to 5 mm, the body having a wall thickness at the second end section within the range of from 0.8 to 10 mm.

4. The connector according to claim 3 wherein the cylindrical outer surface and the cylindrical outer surface are joined together and are continuous one with another, forming a single long cylindrical outer surface of the body.

5. The connector according to claim 3 wherein the cylindrical outer surface and the cylindrical outer surface are joined together by a mid-section of the body having a polygonal shape, the fluid passage extending through the mid-section and having a minimum wall thickness within the mid-section of at least as great as the wall thickness.

6. The connector according to claim 5 wherein the connector further comprises a third end face, the third end face having an opening into a branch passage fluidically connected the fluid passage.

7. The connector according to claim 1 wherein the body comprises PFA.

8. The connector according to claim 1 wherein the body comprises PTFE.

9. The connector 20 according to claim 1 wherein the body comprises alumina.

10. The connector according to claim 1 wherein the reinforcing and/or protecting ring comprises PEEK.

11. The connector according to claim 1 wherein the sleeve comprises stainless steel.

12. The connector according to claim 1 wherein the reinforcing and/or protecting ring abuts the retaining ring on the proximal side thereof and extends to within no closer than 0.4 mm of the first end face.

13. The connector according to claim 1 wherein the reinforcing and/or protecting ring abuts the retaining ring on the proximal side thereof and extends beyond the first end face by at least 0.4 mm.

14. The connector according to claim 1 wherein the sleeve, with bearing surface in contact with the distal surface of the retaining ring, extends along the body to within no closer than 1.8 mm of the first end face.

15. The connector according to claim 1 wherein the gripping surface comprises one or both of (1) a surface shaped to receive a wrench or other turning tool and (2) a roughened surface.

* * * * *